US009058590B2

(12) United States Patent
Criddle et al.

(10) Patent No.: US 9,058,590 B2
(45) Date of Patent: Jun. 16, 2015

(54) CONTENT UPLOAD SAFETY TOOL

(75) Inventors: Linda Criddle, Redmond, WA (US);
David Milstein, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1894 days.

(21) Appl. No.: 11/279,213

(22) Filed: Apr. 10, 2006

(65) Prior Publication Data
US 2007/0266079 A1    Nov. 15, 2007

(51) Int. Cl.
*H04M 1/64* (2006.01)
*G06Q 10/10* (2012.01)

(52) U.S. Cl.
CPC .................................. *G06Q 10/107* (2013.01)

(58) Field of Classification Search
CPC .................................. G06F 21/00; G06F 3/01
USPC ........................... 379/67, 67.1, 88.23, 201.11
See application file for complete search history.

(56) References Cited

U.S. PATENT DOCUMENTS

| 7,444,518 | B1* | 10/2008 | Dharmarajan et al. | 713/185 |
| 7,526,467 | B2* | 4/2009 | Fogel | 706/62 |
| 2003/0004897 | A1* | 1/2003 | Smith, IV | 705/76 |
| 2003/0061111 | A1* | 3/2003 | Dutta et al. | 705/26 |
| 2003/0139910 | A1* | 7/2003 | Yamamoto et al. | 702/188 |
| 2009/0119768 | A1* | 5/2009 | Walters et al. | 726/12 |

* cited by examiner

*Primary Examiner* — Curtis Kuntz
(74) *Attorney, Agent, or Firm* — Bryan Webster; Kate Drakos; Micky Minhas

(57) ABSTRACT

Embodiments of content safety upload techniques are presented herein. In an implementation, outbound communications of client are monitored to detect personal identifying information (PII) in the content being communicated. Upon detection of PII one or more actions may be taken to manage the PII, for example warning a user, providing options to send or delete the communication, seeking approval and so on. Further, released PII may be tracked to permit reporting and subsequent management of PII released in outbound communications.

20 Claims, 5 Drawing Sheets

CONTENT UPLOAD SAFETY TOOL

BACKGROUND

As the internet has become increasingly more popular, there has been a corresponding increase in the amount of personal identifying information (PII) that may be stored or displayed online, such as associated with user accounts. The more personal identifying information available online the higher the risk of misuse of that information such as through identity theft, interference with privacy, threats to safety, and so forth.

Users commonly think about third party security breaches such as release of credit card information as the prevalent manner in which bad actors may obtain PII. However, users may unwittingly or inadvertently expose themselves to risk everyday in ordinary interactions online such as e-mail, instant messaging, chats, social networking, postings and dealings with web sites or web services. Through these interactions, for instance, users may upload content which includes PII such as names, addresses, telephone numbers, social security numbers and so forth. Additionally, users may not appreciate the risk of these everyday releases of PII and may not be able to make informed decisions as to whether they should provide PII to various recipients or post it publicly on their websites.

SUMMARY

Content upload safety techniques are described. In an implementation, outbound communications of a client are monitored, such as by execution of a detection module in the background on the client. The detection module determines if content in the outbound communications of the client contains personal identifying information (PII). For example, the detecting may be based upon definitions of PII which may be by common format, keywords, user-defined values, and so forth.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

Figure 1:
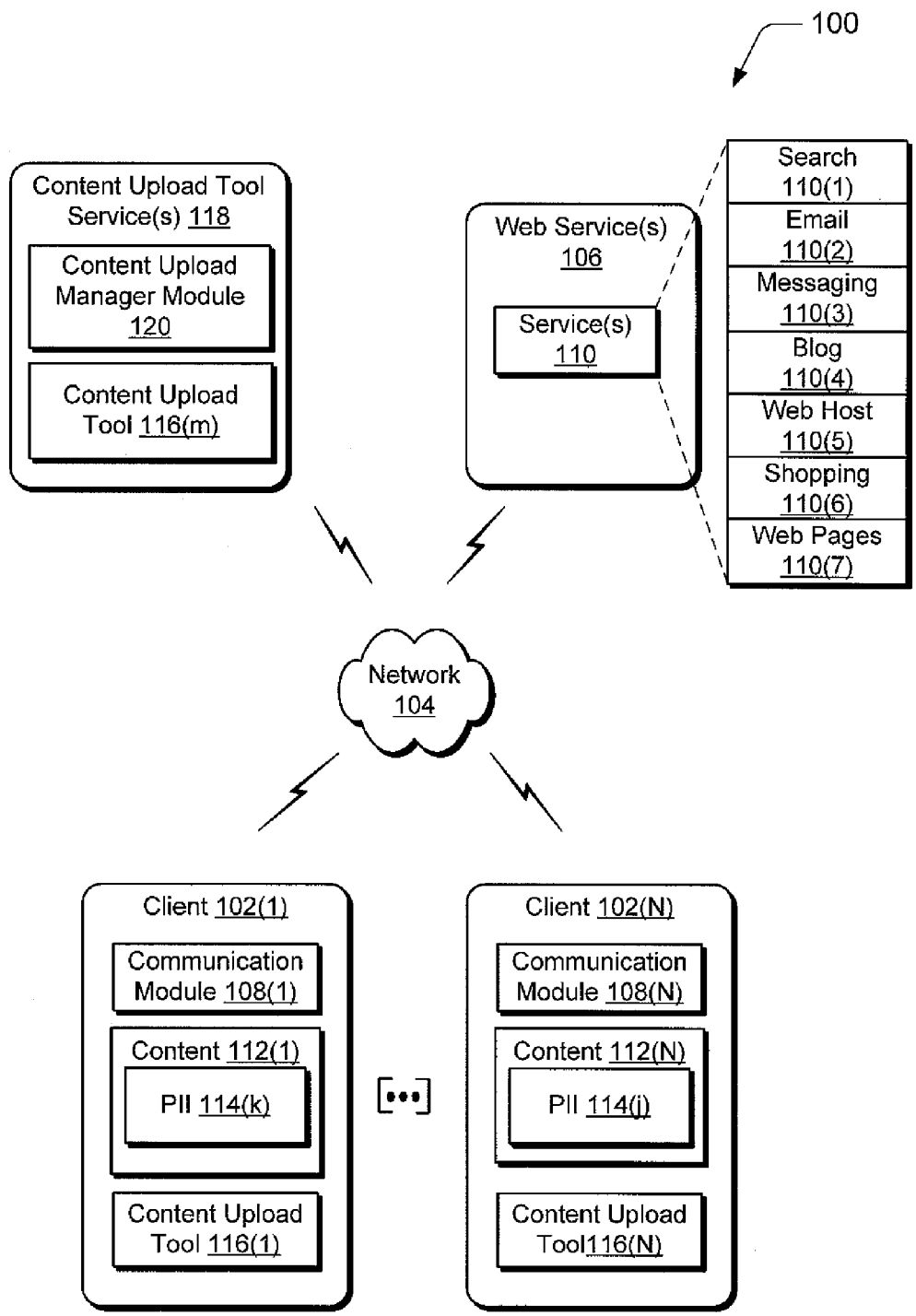
FIG. 1 is an illustration of an environment operable for communication of content, such as web postings, emails, instant messages, and so on, across a network and is also operable to employ content upload safety techniques.

Through a variety of posting of and interactions with content online (e.g., via the world wide web) users may unwittingly or inadvertently send out a variety of personal identifying information (PII). PII as used herein may include information that may be directly or indirectly identifying as well as other user defined sensitive information which the users may not want exposed. Some examples of directly identifying PII include social security numbers, date of birth, addresses, names, account numbers, ages, and so forth. PII which might be indirectly identifying may include school names, sports teams a child participates on, places they hang out, email addresses, personal uniform resource locators (URL's), and instant messaging (IM) addresses. PII may also include user defined types of sensitive information such as religious or other group affiliations, travel plans (e.g., information that a house will be empty), medical information, income information, and so on.

In the hands of bad actors the PII may be used for ill doings such as identity theft, fraud, threats to property or personal security, and so forth. Thus, ordinary online interactions of users, such as web posts, emails, chats, web crawlers or bots, voice over internet protocol (VoIP) calls, text messaging, instant messaging, e-commerce with web services, and so on, may pose a safety and security risk to users. Additionally, users generally do not appreciate the risks, or know how to manage PII in the content they produce for outbound communication. Further, tools to assist users in proactively managing PII in outbound content are limited or non-existent.

Content upload safety techniques are described which may be utilized to assist users or groups of users (e.g., families, businesses, organizations) in the detection, management, and tracking of personal identifying information (PII). For example, a module may be executed to operate on a client and monitor outbound communications of the client. The outbound communications may include a variety of content such as emails, web posting, instant messages, information entered via a browser, and so forth. These content items may each include personal identifying information (PII) which if sent from the client to a recipient may pose identity and security risks.

The module may further operate to determine if the content items indeed include PII. For instance an email message may be scanned and found to contain an email address, a home address and an account username. A variety of techniques may be used to identify PII in content such as by common formats of PII (e.g., xxx-xxx-xxxx is a phone number), by keywords such as SSN for social security number, by specific user defined values and so forth.

In an implementation, a variety of actions may be performed to manage detected PII. For instance, a warning may be formed indicating that PII was detected in an outbound communication, such as the email of the previous example. In combination with the warning, a variety of options may be provided, such as deleting the email, removing the PII from the email, permitting the email to be sent with the PII, and so forth. A variety of predefined and user specified preferences may be used to determine which actions are performed in managing various PII and different actions may be performed based upon the intended recipient.

Further, when PII is sent from a client to a recipient the sent PII may be tracked. For instance, when PII is sent, an upload history may be generated by a module which keeps track of released PII and corresponding recipients. The upload history may be utilized in generation of reports which may be used to provide a comprehensive view or map of all the PII which has been sent out with outbound communication for a user, client, or group. The associated user, client, or group may then use the report to take corrective action such as the removal of posted PII.

In the following description, an exemplary environment is first described which is operable to employ the PII monitoring techniques. Exemplary procedures are then described which may operate in the exemplary environment, as well as in other environments.

Exemplary Environment

FIG. 1 is an illustration of an environment 100 operable for communication of content and messages across a network and to employ the content upload safety techniques of the present disclosure. The environment 100 is illustrated as including a plurality of clients 102(1), ..., 102(N) that are communicatively coupled, one to another, over a network 104. The plurality of clients 102(1)-102(N) may be configured in a variety of ways. For example, one or more of the clients 102(1)-102(N) may be configured as a computer that is capable of communicating over the network 104, such as a desktop computer, a mobile station, a game console, an entertainment appliance, a set-top box communicatively coupled to a display device, a personal digital assistant, a wireless phone, and so forth. The clients 102(1)-102(N) may range from full resource devices with substantial memory and processor resources (e.g., personal computers, television recorders equipped with hard disk) to low-resource devices with limited memory and/or processing resources (e.g., traditional set-top boxes). In the following discussion, the clients 102(1)-102(N) may also relate to a person and/or entity that operate the client. In other words, client 102(1)-102(N) may describe a logical client that includes a user, software and/or a machine.

Additionally, although the network 104 is illustrated as the Internet, the network may assume a wide variety of configurations. For example, the network 104 may include a wide area network (WAN), a local area network (LAN), a wireless network, a public telephone network, an intranet, and so on. Further, although a single network 104 is shown, the network 104 may be configured to include multiple networks. For instance, clients 102(1), 102(N) may be communicatively coupled via a peer-to-peer network to communicate, one to another. Each of the clients 102(1), 102(N) may also be communicatively coupled to one or more of a plurality of web services 106 over the Internet. A variety of other examples are also contemplated.

Each of the plurality of clients 102(1), ..., 102(N) is illustrated as including a respective one of a plurality of communication modules 108(1), ..., 108(N). In the illustrated implementation, each of the plurality of communication modules 108(1)-108(N) is executable on a respective one of the plurality of clients 102(1)-102(N) to provide a variety of interactions in which communications may be sent and received. Clients 102(1)-102(N) may form a variety of outbound communications such as between two clients, between a client and a web service 106, and so on.

For example, one or more of the communication modules 108(1)-108(N) may be configured to send and receive email. Email employs standards and conventions for addressing and routing such that the email may be delivered across the network 104 utilizing a plurality of devices, such as routers, other computing devices (e.g., email servers), and so on. In this way, emails may be transferred within a company over an intranet, across the world using the Internet, and so on. An email, for instance, may include a header, text, and attachments, such as documents, computer-executable files, and so on. The header contains technical information about the source and oftentimes may describe the route the message took from sender to recipient.

In another example, one or more of the communication modules 108(1)-108(N) may be configured to send and receive instant messages. Instant messaging provides a mechanism such that each of the clients 102(1)-102(N), when participating in an instant messaging session, may send text messages to each other. The instant messages are typically communicated in real time, although delayed delivery may also be utilized, such as by logging the text messages when one of the clients 102(1)-102(N) is unavailable, e.g., offline. Thus, instant messaging may be thought of as a combination of email and Internet chat in that instant messaging supports message exchange and is designed for two way live chats. Therefore, instant messaging may be utilized for synchronous communication. For instance, like a voice telephone call, an instant messaging session may be performed in real-time such that each user may respond to each other user as the instant messages are received. Instant messaging may occur in a variety of ways such as via an instant messaging service, directly via a peer-to-peer connection and so on.

Further, one or more of communication modules 108(1)-108(N) may be configured as an internet browser or other integrated or stand-alone application through which clients 102(1)-102(N) may interact via network 104 with a variety of online resources, websites, services and so forth. For instance, clients 102(1)-102(1N) may interact with one or more of web services 106 via network 104. Web services 106 represent an array of resources available via the internet (e.g., network 104) and may include a plurality of internet service providers, online merchants, internet portals, web sites, and so forth. Each of web services 106 may be configured to provide one or more of a range of services 110. It will be appreciated that a variety of services 110 may be provided to clients 102(1)-102(N) by web services 106. By way of example, services 110 may include search service 110(1), email service 110(2), instant messaging 110(3), an internet blog 110(4), web hosting 110(5), shopping 110(6), and web pages 110(7). This list is merely representative of the vast resources which may be made available to clients 102(1)-102(N) though web services 106 and is not meant to be exhaustive.

Although communications configured as emails, instant messages, and web service interactions have been described, a variety of textual and non-textual (e.g., graphical messages, audio messages, and so on) communications, postings, interactions, and so forth may be communicated from clients 102(1)-102(N) via the environment 100 without departing from the sprit and scope thereof.

In the various described interactions of clients 102(1)-102(N) via communication modules 108(1)-108(N) (e.g., outbound communications by emails, instant messages, and web service interactions), clients may produce a variety of content 112. Each client 102(1)-102(N) is depicted having respective content 112(1)-112(N) which represents the variety of outbound communications produced by clients 102(1)-102(N) such as emails, instant messages, search strings, text messages, voice over internet protocol (VoIP) calls, information entered in forms on web pages, internet chats, web postings, blog postings, transactional data in e-commerce, and so on.

As previously described, the users in sending outbound communications and/or releasing content 112(1)-112(N) may expose themselves to relative increases in risk of loss of private information and accordingly identity theft. Upon sending outbound communications, users may lose control of the content 112(1)-112(N) in emails, instant messages, content posted or sent to a web site, purchasing information, and so forth. In other words, releasing content 112(1)-112(N) may pose a privacy and security threat to users.

More particularly, the various content 112(1)-112(N) may contain a variety of personal identifying information (PII) (referred to herein generally as PII 114) which is represented in FIG. 1 as different sets of PII 114(k), 114(j) associated with different clients 102(1), 102(N) and content 112(1), 112(N) respectively. Sets of PII 114(k), 114(j) associated with different clients 102(1), 102(N) may include some or all of the same PII 114, or may be entirely different. When PII 114 is included in outbound communications, the PII 114 may be intercepted, viewed or received by others, and so forth, and accordingly may end up in the possession of bad actors that may use the PII 114 for fraudulent, illegal and/or malicious purposes such as identity theft, criminal activity, and/or other misuses of PII 114.

PII 114 may include a variety of personal information of clients 102(1)-102(N) and/or users of clients 102(1)-102(N) for example names, addresses, telephone numbers, zip codes, area codes, social security numbers, account names, photos, user or device identifiers, license numbers, account numbers and so forth. PII 114 might also include a variety of private or sensitive data, such as financial data, medical records, customer lists, business data, group memberships, contacts or buddy lists, internet history, download history, and so forth. PII 114 may include information which directly identifies users (e.g., address, name, business name) or that is indirectly identifying of or traceable to users (e.g., a school name, a daycare name, a customer list). Further, PII 114 may relate to a client device, to an individual and/or to a group of associated people such as a family, a business, an organization and so on. In an implementation described in more detail in FIG. 2, users may designate or define a variety of sensitive information they do not wish to be exposed via their interactions as PII 114. Thus, PII 114 as used herein generally refers to a variety of types of information that has been designated as potentially risky to send in outbound communications because the PII 114 may be used by others to engage in malicious, illegal, and/or fraudulent activities such as identity theft, fraud, threats to person or property and so forth against an individual or group.

Loss of PII 114 via third parties has received some publicity and individuals may be informed regarding the risks of third-party releases of PII 114, such as through security breaches at a credit card web site. However, individuals may not appreciate the risk that their own activities (outbound communications, emails, posting etc.) may pose. Sending PII 114 such as phone numbers, addresses and so forth in one particular instant message, email or posting is an ordinary occurrence and may seem innocuous to individuals. However, the cumulative amount of PII 114 released in a variety of outbound communications (e.g., name in one item, address in another, zip code in another, and so on) may permit others to reconstruct an electronic identity of individuals like putting together pieces of a puzzle. Further, enhanced web searching and web crawling technologies currently available may facilitate such a reconstruction of identity from pieces of PII 114.

A technique is introduced herein which may be utilized to help prevent the unwitting or inadvertent release of PII through the use of content upload tools 116(1)-116(N). Clients 102(1)-102(N) are depicted as having respective content upload tools 116(1)-116(N) that are representative of software which may be utilized to monitor respective outbound communications to detect, manage, and/or track the release of PII 114 in content 112. Content upload tools 116(1)-116(N) may be implemented as one or more modules that may include a variety of monitoring, filtering, reporting and management features further discussion of which may be found in relation to FIG. 2.

In an implementation, content upload tools 116(1)-116(N), executed on the respective clients 102(1)-102(N) are configured to scan content 112(1)-112(N) of outbound communications prior to sending the communication from clients 102(1)-102(N) to determine if PII 114 is contained in the communication. For example, a communication module 108(1) of client 102(1) may be executed to form content 112(1) configured as an entry for a web blog or online in an online message board provided by a web service 106. The blog entry may include PII 114(k), such as a telephone number "555-1234" and a name "Bob Smith". Respective content upload tool 116(1) operates to monitor the content of the intended blog posting and detects the content 112(1) prior to the data actually being posted. For instance content 112(1) of the intended outbound communication (e.g., posting) may be scanned to detect the PII 114(k) included therein. Upon detection of PII 114(k), content upload tool 116(1) may be configured to perform one or more additional actions for management of the PII 114(k) such as preventing and/or restricting the communication of the content 112(1). For example, such actions may include quarantining the content 112(1), providing a notification, redacting the content 112(1), deleting the content, or performance of other actions for managing PII 114 further discussion of which may be found in relation to FIG. 2. Therefore, detected PII 114(k) may be treated accordingly, such as being flagged, restricted, modified (redacted), routed to a quarantine folder, deleted, and so on.

The content upload tools 116(1)-116(N) may be configured in a variety of ways to provide management of PII 114. For example, the content upload tools 116(1)-116(N) may be preconfigured and provided to each of the clients 102(1)-102(N) to detect PII 114 and perform actions which are set by default. Further, a user may personalize one of content upload tools 116(1)-116(N) to manage user specified PII 114, to respond to detected PII 114 in customized ways, to respond to different recipients in customized ways, and so forth.

In other instances portions of the functionality of content upload tools 116(1)-116(N) may operate in combination with or be provided by one or more content upload tool service 118 via network 104. A representative content upload tool service 118 is depicted in FIG. 1 which includes a content upload manager module 120. Content upload manager module 120 represents functionality to provide content upload service via network 104, to manage the service and access to the service, to interact with a plurality of clients 102(1)-102(N), and so forth. Further, content upload manager module 120 may incorporate functionality to provide services to client 102(1)-102(N) including compiling and providing PII definitions, account management for groups of associated clients and/or individuals, tracking and reporting features for released PII, risk assessments, threat alerts and so forth, which is further described in relation to FIG. 2.

In an implementation, the content upload tool service 118 may also provide content upload tools as a service over network 104 and accordingly is illustrated as including a respective content upload tool 116(m). Thus, content upload tool service 118 may be configured to monitor outbound communications of a plurality of clients 102(1)-102(N) via network 104. For instance, clients 102(1)-102(N) may be configured to direct outbound communications to content upload tool service 118 for detection of PII 114 before releasing respective content 112(1)-112(N). Naturally, the functionality described as provided by content upload manager module 120 may be implemented through one or more sub-modules, further discussion of which may be found in relation to FIG. 2.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the content upload safety techniques described below are platform-independent, meaning that the techniques may be implemented on a variety of commercial computing platforms having a variety of processors.

Figure 2:
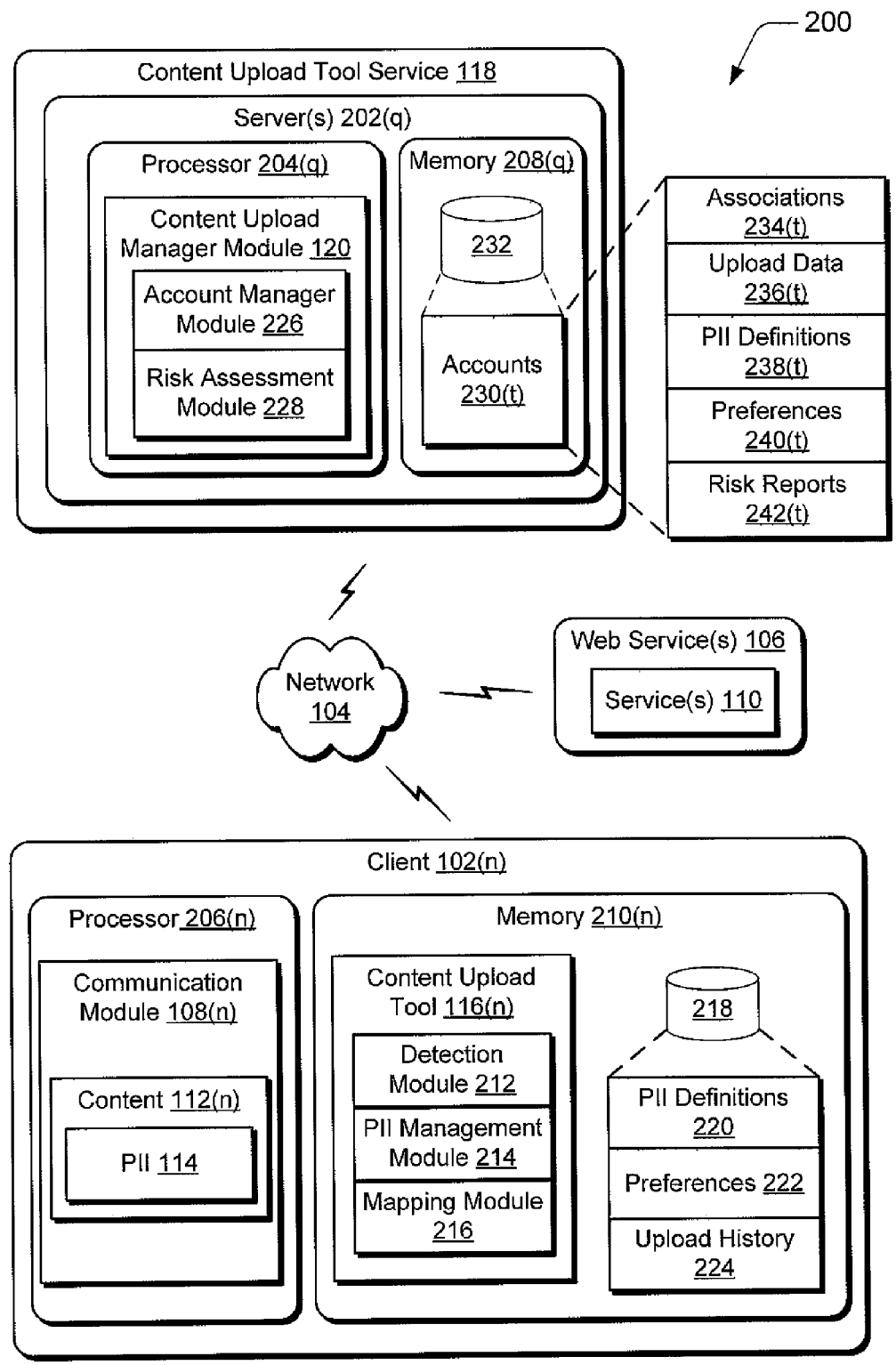
FIG. 2 is an illustration of a system in an exemplary implementation showing a plurality of clients and a content upload tool service of FIG. 1 in greater detail.

FIG. 2 is an illustration of a system 200 in an exemplary implementation showing the plurality of clients 102($n$) and the content upload tool service 118 of FIG. 1 in greater detail. Client 102($n$) is representative of any of the plurality of clients 102(1)-102(N) of FIG. 1, and therefore reference will be made to client 102($n$) in both singular and plural form. The content upload tool service 118 is illustrated as being implemented by one or more servers 202($q$) (where "q" may be any number from one to "Q") and the client 102($n$) is illustrated as a client device. Further, the server(s) 202($q$) and the client 102($n$) are illustrated as including respective processors 204 ($q$), 206($n$) and respective memory 208($q$), 210($n$).

Processors are not limited by the materials from which they are formed or the processing mechanisms employed therein. For example, processors may be comprised of semiconductor (s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208($q$), 210($n$) is shown for the respective server(s) 202($q$) and client 102($n$), memory 208($q$) and 210($n$) may be representative of a wide variety of types and combinations of memory that may be employed, such as random access memory (RAM), hard disk memory, removable medium memory, and other computer-readable media.

The clients 102($n$) are illustrated as executing the communication module 108($n$) on the processor 206($n$), which are also storable in memory 210($n$). The communication module 108($n$) is executable to form content 112($n$) for outbound communication via the communication module 108($n$), for instance email messages. Further, the content 112($n$) may include a variety of PII 114. The content upload tools 116($n$) are illustrated as being stored in memory 210($n$) and are executable on the processor 206($n$) to monitor outbound communications for detection and management of PII 114. For instance, the upload tool may operate in the background on clients 102($n$) and monitor for PII in content 112($n$) before it is released, e.g., sent from the client 102($n$) to a recipient via network 104. The client 102($n$) may employ a variety of architectures to perform this monitoring of outbound communications for PII 114, and one or more subsequent actions, an example of which is described as follows.

The content upload tool 116($n$) is depicted in FIG. 2 as implemented via a variety of sub-modules which may include a detection module 212, a PII management module 214, and a mapping module 216. As previously described, the content upload tool 116($n$) may be configured to detect and manage a variety of PII 114 in outbound communications of clients 102($n$). In one or more implementations, a variety of configurations, settings, and/or data is maintained accessible to client 102($n$) and used by the content upload tool 116($n$) for the detecting and managing of PII 114. For instance, memory 210($n$) includes storage 218 which is depicted as storing PII definitions 220, preferences 222 and upload history 224. Thus, content upload tool 116($n$) and/or the variety of sub-modules may access a variety of data from storage 218 to perform the detection and management of PII 114. It is noted that the variety of data may also be accessible via network 104 from remote storage, such as from memory 208($q$) of content upload service 118, or other remote storage. Thus, configurations, settings, and/or data utilized by content upload tool 116($n$) may be accessed locally, retrieved by a client 102($n$) from remote storage, and/or synced with data maintained in remote storage via network 104.

The detection module 212, for instance, is representative of functionality to monitor outbound communications of client 102($n$) to detect and identify PII 114. Detection module 212 may operate in the background on a client 102($n$) to monitor outbound communications from a variety of sources, for example a plurality of communications modules 108($n$), a plurality of ports of the client 102($n$) and so on. Detection module 212 may further determine if the outbound communications contain PII 114 such as by scanning or examining content items 112($n$) in the communications. Further, the determination may be based upon a variety of PII definitions 220. Thus, the detection module may be configured to access a plurality of PII definitions 220 and from local storage 218 or remote storage, and may use the PII definitions 220 to determine if content 112($n$) includes PII 114.

PII definitions 220 generally describe the PII 14 which the content upload tool 116($n$) will scan to detect. The PII definitions 220 may additionally include data to categorize PII 114 by different types, to associate different levels of risks with different PII 114, and instructions for detecting various PII 114.

PII definitions 220 may be configured in a variety of ways to describe PII 114 which is to be detected. For instance, PII definitions 220 may include common formats for PII 114 such as for social security numbers "xxx-xx-xxx", phone numbers "(xxx) xxx-xxx", credit card numbers, and so forth. Thus, detection module 212 may be configured to scan for these and a variety of other common formats of PII 114. Further, PII definitions 220 may include specific values such as "555-1234", "123 Cherry Lane" which may be wholly or partially matched. Users may also define specific values or keywords in PII definitions 220, which might include information that is considered private by the user, and which accordingly the user may not want to be sent out in posted content. Some examples may be a yearly income, a membership in an organization, drug prescriptions, and so forth. Thus, users may define keywords or values in PII definitions 220 which cause detection module 212 to scan for the defined information.

PII definitions 220 may further include contextual values and keywords. For instance, "SSN", "DOB", and "Home Address" are examples of values which are indicative of particular PII 114 in a content item 112($n$). Accordingly, PII definitions 220 may be configured with a variety of contextual values and keywords which a detection module 212 may use for detection of PII 114. The detection module may operate on the content produced by users (e.g. values input by users) as well on the content contained in web pages, forms, interfaces, and so forth involved in user interactions. For instance, if user sends an e-mail and uses the phrase "SSN" this may be flagged as PII. In another instance, user may be presented with a form including a data entry field labeled as "Credit Card No." and based on application of contextual values to the form, data input into the field may be identified as PII.

Once PII 114 is detected, content upload tool 116(*n*) may perform one or more additional actions to manage the PII 114. PII management module 214 is representative of functionality to manage detected PII 114 which may include one or more of preventing the corresponding outbound communication, quarantine of content having PII 114, applying restrictions on PII 114, forming notification regarding PII, redacting the content 112(*n*) associated with the PII 114, deleting the content 112 and/or PII 114, seeking permission to allow release of the PII 114 and so on.

For example, a user may use a communication module 108(*n*) configured as a web browser to fill in a purchasing form provided by a web service 106 configured as a merchant site. The user may input credit card info into the form obtained from the web service and displayed to the user on the client 102(*n*) via the web browser. Prior to sending or posting of the input purchasing data to the web service 106, detection module 212 may detect the PII 114, e.g. credit card info in the outbound content 112(*n*). The PII management module 214 may then perform one or more actions to manage to PII 114.

For instance, a warning may be generated indicating that PII 114 has been detected in the outbound communication. The warning may be communicated to the user in as variety of ways, such as via a prompt or pop-up box in the web browser. The warning may include a variety of information, such as identifying the PII 114, indicating risks associated with the PII 114, and/or links to additional information. Further, a variety of options may be provided such as continuing with posting the content (override or ignore), options to modify or delete the PII 114, options to seek authorization for releasing the PII 114, and so forth, In an implementation, PII management module 214 may manage PII 114 for groups of associated users. Preferences 222 set for certain users in a group of associated users, such as children, may require authorization from a supervisor, such as a parent, before a posting with PII 114 is allowed. The warning accordingly, may be configured to provide an option to get the necessary authorization from a parent or to delete the posting. Authorization may be obtained in a variety of ways. For instance, PII management module 214 may be configured to determine if the parent or supervisor is online and may send an email or instant message seeking authorization. Alternatively, PII management module 214 may place the content item 112(*n*) in a quarantine folder until authorization is obtained.

For example, a child may write an email to be sent to a friend with directions to their house including the home address. Prior to sending the email to the friend, the detection module 212 may scan the email and identify the home address as PII 114. PII management module 214 may provide notice to the child that the address information may not be sent without authorization or approval from the parent. An option to seek authorization or to delete the PII 114 or the email message may be given. If the child chooses to seek authorization, PII management module 214 may determine if the parent is on-line and may send an authorization message such as by e-mail or instant message. If authorization is obtained, the e-mail may be sent. If the parent is not available, the email may be quarantined until it is reviewed by the parent and either permitted or rejected.

In an implementation, the management of detected PII 114 is based on a variety of preferences 222 which may be set by default, user defined or a combination thereof. A variety of preferences 222 are depicted as stored within storage 218 in memory 210(*n*) of client 102(*n*). Preferences 222 may also be accessible to clients 102(*n*) via network 104. Preferences 222 may be configured to define rules for the detection and management of PII 114. For instance preferences may define which PII 114 or types of PII 114 will be detected, e.g. via detection module 212. In other words, detection of various PII may be toggled (e.g., turned on or off) via preferences 222 either by default settings or by user configuration. As an example a user may set preferences which indicate that contact information such as a home address will not be detected as PII 114 and that financial information such as credit card number will be detected as PII 114.

Preferences 222 may also include data which defines a set of rules for the management of PII 114 such as by PII management module 214. For instance, rules may be defined regarding what PII 114 may be released, to which recipients it may be released, conditions for the release of PII, actions to be taken with respect to different types of PII 114 and/or content 112(*n*) containing PII 114 and so forth. Thus, PII management module 214 may be configured to apply the rules specified in the preferences 222 to manage detected PII 114.

For instance, preferences 222 may be set which filter outbound PII 114 based on the recipient such as according to various email addresses, web sites, uniform resources locators (URLS), instant message contacts and so forth. Thus, preferences 222 may indicate permission to receive and/or restrictions upon receiving PII 114 based on the intended recipients. Further, permissions/restrictions may be different for different categories or types of PII 114. For instance, particular e-mail contacts may be permitted to receive contact information such as a home phone number, but would not be permitted to receive a credit card number or social security number. A variety of different PII 114 category restrictions are contemplated.

In an implementation, preferences 222 may be established based at least in part upon a rating service which provides relative risk ratings for various entities (e.g., potential recipients of PII 114). For example, a rating service may provide risk ratings for a plurality of web services 106 previously described. A web service 106 with relatively high risk rating from the service may be entirely prevented from receiving PII 114, while another web service 106 with a lower associated risk may be permitted to receive some types of PII 114 and so on. Client 102(*n*) may access ratings from network 104 which may include accessing on demand or downloading of ratings on a periodic basis. In an implementation, the rating service may be provided by the content upload tool service 118 previously described or as a stand alone third party service, such as a web service 106 configured to provide the risk ratings.

In an implementation a mapping module 216 is included with content upload tool 116(*n*) which is representative of functionality to track released PII 114 and provide a history or map of the tracked PII 114 As previously discussed preferences 222 may permit some types of PII 114 to be released, to some recipients. Mapping module 216 may track these releases of PII 114 may be tracked and subsequently a map or history of the released PII 114 may be generated.

For instance, upload history 224 is depicted as being stored in storage 218 of client 102(*n*). The upload history 224 is configured to indicate which PII 114 was released, who received the PII 114 and when it was released. Further, mapping module 216 may be configured to provide the upload history 224 to a client 102(n) and or user, for instance via reports configured for a display on a display device or communicated via email or instant messaging. A user may then review the PII 114 that has been allowed to go outbound to various recipients.

Further, mapping module 216 may be configured to analyze the PII 114 released by type and associated risk. Based on the analysis an overall relative risk rating for the client 102(n) may be determined. The relative rating may be communicated as a number value, a visual value such as a color scale, a textual scale (e.g., "low", "ok", "medium", "high") and so on. Reports by mapping module 216 may be generated on demand, on a periodic basis, upon the crossing of a threshold risk level and so forth. Thus, users may be provided with an upload history informing them how much PII 114 various web services 106 or other recipients may have been given and an indication of the relative amount of risk represented by the released PII 114. Users may then take action, such as to remove or request removal of the PII 114 from one or more recipient.

As previously described, clients 102(n) may also interact via network 104 with a content upload tool service 118 which is illustrated as executing content upload manager module 120 on processor 204(q) of server 202(q) and which is also storable in memory 208(q). Content upload manager module 120 is executable to provide content upload tool services to a plurality of clients 102(n) and may include functionality to manage the service, to access the service, and to interact with a plurality of clients 102(n). Content upload manager module 120 is further illustrated as having a variety of sub-modules including an account manager module 226 and a risk assessment module 228.

Account manager module 226 represents functionality within content upload manager module 120 to manage a plurality of accounts 230(t) (where "t" may be any integer from two to "T"). For instance, users of the content upload service 118 may register for respective accounts 230(t) which are illustrated as being maintained in storage 232 in memory 208(q). Accounts 230(t) may correspond to individual users or groups of associated users such as a family, business organization, household and so forth. Users may sign-in to a respective account 230(t) with the content upload tool service 118 from a variety of client 102(n) devices to access their account 230(t) and data and/or services associated with the account. A variety of account data may be associated with respective accounts 230(t) which may include for example associations 234(t), upload data 236(t), PII definitions 238(t), preferences 240(t), and risk reports 242(t).

In an implementation, the account manager module 226 may be configured to send and receive various data associated with accounts 230(t) to and from clients 102(n). For example, content upload tools on clients 102(n) may be configured to provide upload data 236(t), PII definitions 238(t), and preferences 240(t) for maintenance by the account manager module 226 with respective accounts 230(t).

Upload Data 236(t) represents upload history data 224 indicating PII 114 that has been released as previously described and which is received from one or more of clients 102(n). The content upload tool 116(n) of a client 102(n) may be configured to provide account manager module 226 upload history data 224 via network 104. The account manager module 226 then associates the upload data 236(t) from one or more clients with a corresponding account 230(t).

Similarly, PII definitions 238(t) and preferences 240(t) may be configured as PII definitions 220 and preferences 222 previously described, and which are maintained for an associated account 230(t) and stored remotely from clients 102(n). PII definitions 238(t) and preferences 240(t) may be generated for an account 230(t) at the content upload tool service 118 or may be transferred to the content upload tool service 118 from corresponding PII definitions 220 and preferences 222 of a client 102(n).

Thus, in alternative or in addition to having information such as PII definitions 220, preferences 222, and upload history 224 in storage 218 on a client device 102(n), the content upload tool service may be configured to maintain the same or similar types of information in remotely accessible storage. In this manner, a particular user may access the same account 230(t) and associated settings from a variety of client devices 102(n). For instance a user may at various times uses a variety of client devices 102(n) such as each of a home computer, an office computer, a mobile phone, and a set-top box. Account manager module 226 may be configured to provide settings such as PII definitions 238(t) and preferences 240(t) to each of the client devices 102(n) via network 104 for use by respective content upload tools 116(n).

Accounts 230(t) may further include a variety of associations 234(t), which may indicate various clients 102(n), accounts 230(t) and/or users which are associated. Accordingly, content upload tool service may be configured to manage one or more groups of associated users, which may be for example, a family, a household, a business group, and so on. A variety of groups are contemplated which may have or may define common PII 114. For instance, a family may have a common street address, surname, phone number, credit card number and so forth. Similarly an organization such as a business has common PII 114 such as the business name, accounts, customers and so forth. Each member of a group may engage in activities which may release PII 114. Accordingly, it may be beneficial to use the content upload safety techniques described herein to manage PII 114 for entire family or group as whole.

Associations 234(t) represent one illustrative technique for managing a group of associated users or clients. Accounts 230(t) of various users and or clients 102(n) may be associated as group and accordingly associations 234(t) indicate which users are associated. Common upload data 236(t), PII definitions 238(t), preferences 240(t) and so forth may be maintained for the group. One or more supervisory account 230(t) may be established to manage the group such as by configuring settings for the group, managing associations (e.g. group membership and so forth), establishing subordinate accounts, privileges and so on. In the example of a family, a parent may have a supervisor account and subordinate accounts may be established for one or more child. The parent may then configure the settings (e.g., PII definitions 238(t), preferences 240(t) and so forth) for the family.

As previously noted, the content upload tool service 118 may include a content upload tool 116(m) to perform techniques for detection and management of PII as a service via network. In an implementation, the outbound communications for a plurality of clients 102(n) may be monitored directly by the content upload tool service 118, rather than by content upload tools 116(n) on each client 102(n). For instance, outbound communications of a group of associated users who may uses a plurality of client devices 102(n) may monitored by the content upload tool service 118, such that the activities of a group of associated users may be managed.

Risk assessment module 228 represents functionality for a variety of tracking and reporting features for released PII 114, risk assessments, threat alerts and so forth. For instance, risk assessment module may be executed to analyze upload data 236(t) maintained for a particular account 230(t) or group of associated accounts and to generate a respective risk report 242(*t*). Based on the PII 114 indicated by upload data 236(*t*), the risk assessment module 228 makes an assessment of the risk exposure of the associated account. In other words, an assessment of a likelihood of identity theft, breaches of privacy, and so forth. The report may accordingly provide the upload data 236(*t*), indications of the risk associated with each item of PII 114 released, an overall assessment of risk such as a relative risk rating, information on current threats, and so forth. Relative risk may be a rating which may be communicated in a variety of ways such as numerical value, a color on a color scale, textual risk level (e.g., "high risk") and so on.

In an implementation, the risk assessment module 228 may be further configured to compile and utilize additional PII data with upload data 236(*t*) in generating a risk report 242(*t*). While upload data 236(*t*) may indicate known releases of PII 114, additional unknown PII 114 from other sources may exist on the world wide web, such as data posted by third party or by a user if they permitted the release. In one instance, the risk assessment module 228 may perform a web search to search for PII 114 corresponding to an account 230(*t*), such as via web crawler or "bot". The web crawler may be executed to seek out and identify additional PII 114 and may utilizes the preferences 240(*t*) and PII definitions 238(*t*) for an account 230(*t*) to perform the search.

The web crawler may be configured to seek PII 114 from a set of known content sources of a particular user (e.g., commonly accessed sites, accounts and so forth). Further, the scope of the search may be varied to include or exclude various content sources, such as those most frequently used by all users of the service, known high risk sites and so forth. The PII 114 obtained via the web crawler may be used in combination with the upload data to produce a comprehensive map view of PII 114 displayed on or available from the variety of content sources. In an implementation the assessment report 242(*t*) includes links to all the identified content sources so that users may easily clean or delete PII 114 which may put them at risk.

The risk report 242(*t*) may be communicated to a client 102(*n*) or user in a variety of modes and formats, such as via a user interface, by e-mail, instant message and so forth. Risk assessment module 228 may be configured to periodically generate and automatically send a risk report 242(*t*) to an account holder, or a group supervisor. Additionally or alternatively, risk reports 242(*t*) may be generated or accessed on demand.

Exemplary Procedures

The following discussion describes user interaction techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. It should also be noted that the following exemplary procedures may be implemented in a wide variety of other environments without departing from the spirit and scope thereof.

Figure 3:
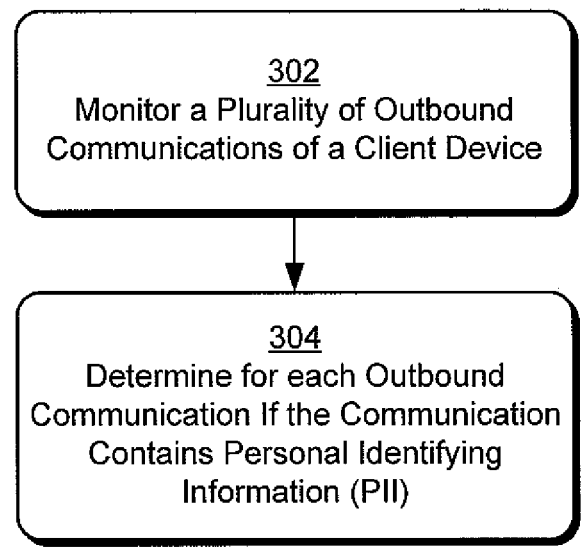
FIG. 3 is a flow chart depicting a procedure in an exemplary implementation in which outbound communication of a client are monitored to detect personal identifying information (PII).

FIG. 3 depicts a procedure 300 in an exemplary implementation in which a determination is made whether outbound communications contain personal identifying information PII. A plurality of outbound communications of a client device are monitored (block 302). For instance, one or more user may use the client 102(*n*) of FIG. 2 to produce content 112(*n*) which will be uploaded via network 104. A user for example may utilize a communication module 108(*n*) configured as web browser to engage in e-commerce with a web service 106 which is an on-line merchant. A purchase form may be exposed in which the user may input a variety of purchasing information, including a credit card number. In another, example another user may use a communication module 108(*n*) configured for instant messaging to engage in an instant messaging session with another client 102(*n*) and/ or user. This user may produce an instant message having a variety of information and which for this example includes the user's phone number and home address.

The content upload tool 112(*n*) may be configured to monitor these and a variety of other outbound communications of a corresponding client 102(*n*). More particularly, the detection module 212 may execute to monitor the communication modes (one or more communication modules 108(*n*)), the ports of client 102(*n*), and so forth for outbound communications. For example, when the user engaging in the purchasing transaction hits enter to send the information via the web browser, detection module 212 may understand that the web browser is attempting to send an outbound communication. Similarly, when the instant messaging user hits send, detection module 212 may understand that the user is attempting to send the outbound instant message.

A determination is made for each outbound communication whether personal identifying information (PII) is contained in the communication (block 304). Continuing the preceding example, at the time the user attempts to send purchasing information and similarly for the instant message, the content upload tool 112(*n*) and more particularly detection module 212, makes a determination as to whether the outbound content contains PII 114. For instance, detection module 212 may scan each outbound communication for potential PII 114 before the communication is sent to the intended recipient. The determination may be based upon a set of PII definitions 220 and preferences 222 as previously described. As the PII definitions 220 may define PII 114 according to common formats, keywords, user specified PII, and so on. Further, preferences 222 may be set that define which PII 114 may be provided to various recipients or contacts, such as an allowed list or filter. Thus, PII 114 may be handled differently for different potential recipients.

In the present example, assume that the credit card information in the purchasing transaction, and that the phone number and home address in the instant message are defined as PII 114 in PII definitions 220. Accordingly, the determination will be made that each of these outbound communications (the purchasing data and instant message) contains PII 114.

Figure 4:
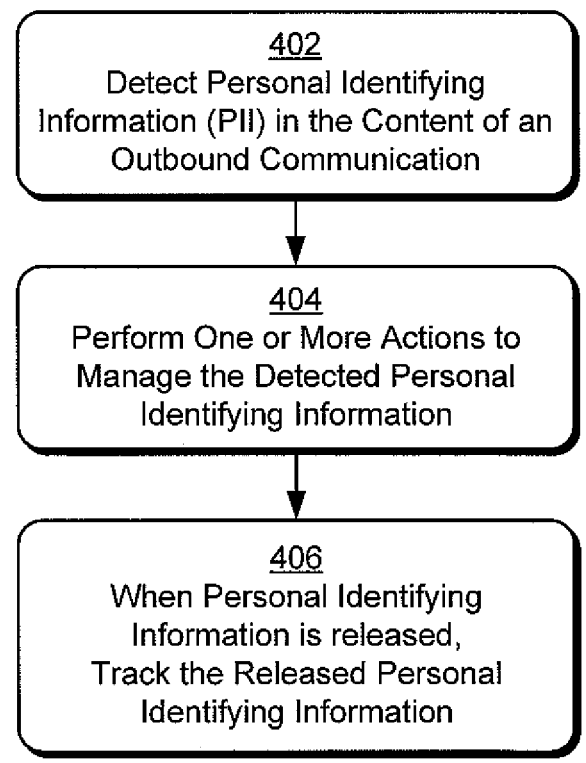
FIG. 4 is a flow chart depicting a procedure in an exemplary implementation in which personal identifying information (PII) in outbound communication is detected, managed, and tracked.

In another instance, preferences 222 may permit certain PII 114 to certain recipients. For instance, the user may designate certain individuals or websites to be trustworthy. Additionally or alternatively a particular web service or site may be trusted based upon a rating service that rates the security and privacy of sites and has indicated that the site/service matches acceptable standards. Accordingly, detection module 212 may not scan for these allowed types of PII 114 For instance, the id associated with the potential recipient (e.g. individual name, web address, URL) of the instant message may be included in an allow list for contact information in preferences 222. Thus, the instant message to the recipient may not be determined to include PII 114. Alternatively, detection module 212 will scan for the permitted PII 114 and the instant message will be determined to include PII 114, however, the outbound instant message will automatically be permitted. In this manner a variety of PII 114 may be detected in outbound communications FIG. 4 depicts a procedure 400 in an exemplary implementation in which personal identifying information (PII) in content is detected, managed and when released tracked. Personal identifying information (PII) is detected in the content of an outbound communication (block 402). For example, the content upload tool 116(n) of FIG. 2 may operate to use PII definitions 220 to detect PII 114 in a content item 112(n). The content item 112(n) may be an email generated by a communication module configured as an email application. A user using the application may form an email such as to a friend which may contain certain PII 114 such as the user's name, a date of birth (DOB), a picture of the user and so forth. In particular a variety of detection schemes and techniques defined by PII definitions 220 may be accessed by the detection module 212 of the content upload tool 116(n) and utilized for scanning of the email. In this case, the PII 114 formatted as a name, a DOB, and a picture may be detected in the outbound email.

One or more actions are performed to manage the detected PII (block 404). For instance, the email in the previous example is scanned by the detection module 212 prior to being sent. Since PII 114 was detected, (e.g. the name, DOB, and picture) a variety of actions may occur to manage the detected PII 114. User preferences 222 as previously described may determine which actions are performed.

In one instance, a warning may be generated such as by PII management module 214 which indicates to the user that PII is include in the outbound communication. Further, the warning may indicate risks associated with the PII 114 or the intended recipient. As an example the warning may be presented as a pop-up window of the operating system of client 102(N), or within a user interface of the email-application. A variety of other warnings are contemplated.

In an implementation the one or more actions may include providing an option to send the communication having the PII 114. Thus, by selecting this option the user may choose to send the email and disregard or override the warning. In another case, the email may contain PII 114 which according to settings such as preferences 222 is never permitted (e.g., may not be overridden) and thus the email would be prevented from being sent. In the latter case, the email may be quarantined or may be deleted automatically depending upon the particular preferences 222 being applied.

In a further example, an option to remove the PII 114 from the outbound communication (e.g., to redact the email) may be provided. Thus, the PII 114 detected may be removed automatically and the email sent safely.

As previously noted a group of users such as family members may have associated accounts and settings that are managed together. If a subordinate account is attempting to send PII 114, such as a child, the PII management module 214 may be configured to require approval from a supervisory account, such as a parent, before sending the message. The parent may be provided some control over the content posting of their children. In this instance, the child may be provided with a warning indicating that the PII 114 must be removed or that approval may be obtained in order to send the email of the present example. An option may be provided to seek approval. If an option for approval is sought, the intended communication (e.g., the email) may be quarantined pending proper approval. As previously noted, a supervisor or parent may be notified for approval if available such as by an automatic email or instant message if online, by an automated voicemail or voice over internet protocol (VoIP) call, and so on sent by PII management module 214. Alternatively, a supervisor or parent may approve by reviewing the quarantined email and determining whether it is to be permitted, deleted, redacted and so forth. Upon receipt of proper approval, the email may be sent.

When PII is released, the released PII is tracked (block 406). Again using the previous email example, the preferences 222 may allow the PII 114 to be released, or an adult or parent may override a warning or give approval for release of the email containing the PII 114 (e.g. name, DOB, picture). Mapping module 216 may be executed to track released PII 114 in these cases. For instance, mapping module may store tracking data, e.g., upload history 224 which identifies PII 114 released, when it was released, to whom it was released and so forth. Thus, mapping module 216 may be configured to store in storage 218 upload history 224 indicating the release of the name, DOB, and picture in the email example previously discussed. Subsequently, the upload history 224 may be utilized to report a mapping of all the released PII 114 to a user to facilitate management of the PII 114, for instance removal of the release PII.

Figure 5:
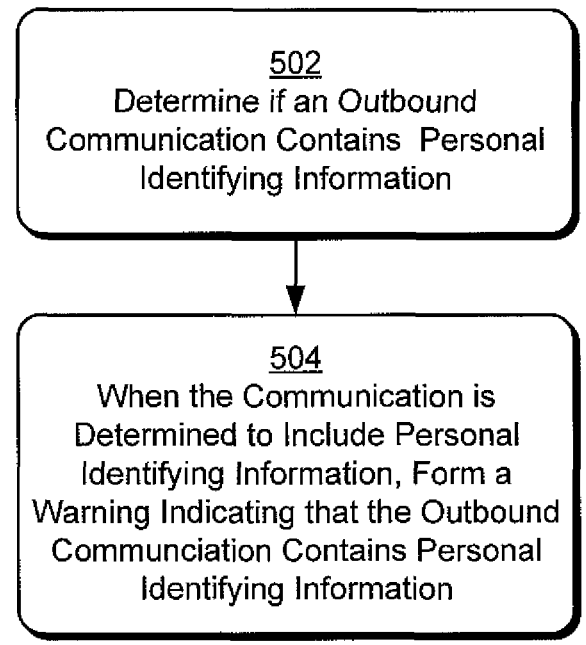
FIG. 5 is a flow chart depicting a procedure in an exemplary implementation in which a warning is generated indicating that personal identifying information (PII) is included in an outbound communication.

FIG. 5 depicts a procedure 500 in an exemplary implementation in which a warning indicating that an outbound communication includes personal identifying information. A determination is made whether an outbound communication includes personal identifying information (PII) (block 502). For example, a client 102(1) of FIG. 1 may be interacting via network 104 with a web service 106. In this example assume that the web service 106 is configured to provide at least a web hosting 110(5) service. Thus the client 102(1) via communication module 108(1) may seek to post content 112(1) to a personal web site managed by the web service 106. In this example the communication module may be configured as a web browser. The content 112(1) to be posted may be configured in a variety of ways, such as web pages, pictures, text, data files and so forth.

Assume now, that the content 112(1) the client 102(1) is seeking to post a spreadsheet file including contact information for a variety of people, such as a group of friends and/or family members. Thus, the spreadsheet may include a variety of addresses, phone numbers, names, e-mail addresses, and so forth. Thus the content 112(1) of this example contains a lot of PII 114(k).

Content upload tool 116(1) may be executed to monitor the intended file upload to detect the PII 114(k) in accordance with the content upload safety techniques described herein. For instance, the spreadsheet file which the client 102(1) is attempting to post may be stopped prior to being sent from client 102(1) to the web service 106 via network 104. Then, content upload tool 116(1) may scan the spreadsheet file to make the determination. In this example, the determination will be made that the outbound spreadsheet file does contains PII 114(k). In other instances, PII 114(k) will not be detected and the spreadsheet file may be permitted to be sent without further action.

When the communication is determined to include personal identifying information, a warning is formed indicating that the outbound communication contains personal identifying information (block 504). In the previous example, the spreadsheet file which the client 120(1) was attempting to post was determined to include PII 114(k), in particular contact information for a variety of persons. Thus, content upload tool 116(1) will form a warning which indicates that PII has been found in the intended upload.

The warning may be configured to indicate the PII 114 which was detected and/or the risks of sending the PII 114. The warning as an example may be a prompt, such as a prompt asking "Are You Sure You Wish to Send This?" A variety of options for managing the PII 114 may be provided in combination with the warning. For instance, options may include options to allow the PII 114 to be sent, to delete the communication, to remove the PII 114 from the communication and so on.

In an implementation the warning may be configured for display in accordance with the communication module 108(1) which formed the outbound communication. Thus, in this instance, the web browser used to post content to web hosting 110(5) service may display the warning. Alternatively, a pop-up box, alert, email, instant message and so forth may be used to communicate the warning which is formed by the content upload tool 116(1).

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented on a computing device by a processor, the method comprising:
   monitoring a plurality of outbound communications of a client device;
   before each outbound communication is sent from the client device, determining if the communication contains personal identifying information (PII);
   storing tracking data corresponding to the PII contained in the outbound communication, wherein the tracking data is utilized to report a mapping of released PII when the PII is released from the client device;
   managing the PII for a group of associated users, the group comprising a supervisory account, wherein the supervisory account establishes a subordinate account and establishes privileges associated with the subordinate account;
   generating a risk assessment report for the group of associated users based at least upon the PII contained in the plurality of outbound communications, the risk assessment report providing information identifying the PII contained in the plurality of outbound communications and corresponding recipients of the outbound communications; and
   performing one or more actions to manage the PII in the plurality of outbound communications, the one or more actions including quarantining the outbound communication from the subordinate account at the client device and requesting approval from the supervisory account before the outbound communication is sent from the client device.

2. The method as described in claim 1, wherein:
   the personal identifying information (PII) is determined based upon a set of PII definitions; and
   the PII definitions include one or more common PII formats used for the determining.

3. The method as described in claim 2, wherein the personal identifying information definitions include one or more keywords used for the determining.

4. The method as described in claim 2, wherein the personal identifying information definitions include one or more user defined personal identifying information values used for the determining.

5. The method as described in claim 1, wherein the one or more actions include providing a warning indicating that the outbound communication contains personal identifying information.

6. The method as described in claim 5, wherein the warning further provides an option to allow the sending of the outbound communication with the personal identifying information.

7. The method as described in claim 5, wherein the warning further provides an option to remove the personal identifying information from the outbound communication before sending the communication.

8. The method as described in claim 1, wherein the approval is requested from a parent of a child attempting to send the outbound communication, the parent having the supervisory account and the child having the subordinate account.

9. The method as described in claim 1, wherein the risk assessment report provides indications based at least on aggregated PII, the indications including one or more of a risk associated with each item of PII released, an overall assessment of the risk from the aggregated PII, threat information, information identifying the PII released, or corresponding recipients of the PII.

10. A method implemented on a computing device by a processor, the method comprising:
    determining if an outbound communication contains personal identifying information (PII);
    when the communication is determined to include the PII, forming a warning indicating that the outbound communication contains the PII;
    tracking the PII by storing tracking data corresponding to the PII released in the outbound communication, wherein the tracking data is utilized to report a mapping of released PII; and
    generating a risk assessment report for a group of associated users based upon aggregated PII including PII released in the outbound communication and additional PII identified from a search of at least one of a plurality of third party accounts, the risk assessment report providing indications including an overall assessment of risk based at least on the aggregated PII.

11. The method as described in claim 10, wherein the forming is performed before the outbound communication is sent over a network to a recipient.

12. The method as described in claim 10, wherein the outbound communication is selected from the group consisting of:
    an email;
    an instant message;
    a web posting;
    a blog entry;
    a chat message;
    a voice over internet protocol (VoIP) call;
    a text message; and
    a message to a web service generated via input to a browser form.

13. The method as described in claim 10, wherein the risk assessment report indicates an overall level of risk for the group based upon the released PII.

14. The method as described in claim 10, wherein the risk assessment report includes one or more links configured to facilitate removal of the PII from the communications sent to one or more of the recipients.

15. The method as described in claim 10, wherein the risk assessment report provides indications including one or more of a risk associated with each item of PII released, threat information, information identifying the PII released, or corresponding recipients of the PII.

16. One or more memories comprising computer executable instructions that, when executed, direct a client to perform operations comprising:
  managing the personal identifying information (PII) for a group of associated users, the group comprising a supervisory account, wherein the supervisory account establishes a subordinate account and establishes privileges associated with the subordinate account;
  before each outbound communication is sent, determining if the communication contains PII;
  outputting a warning before sending a communication from the client when the communication contains PII;
  in an event an authorization to send the communication is received responsive to the warning:
    sending the communication releasing the PII;
    tracking the PII by storing tracking data corresponding to the PII released in the outbound communication, wherein the tracking data is utilized to report a mapping of released PII; and
    generating a risk assessment report for the group of associated users based at least upon the PII released in the outbound communication aggregated with the PII released in earlier outbound communications of the plurality of outbound communications; and
  in an event no authorization to send the communication is received responsive to the warning, performing one or more actions to manage the PII in the plurality of outbound communications, the one or more actions including quarantining the outbound communication.

17. One or more memories as described in claim 16, further comprising instructions to detect personal identifying information in the communication based upon a plurality of definitions describing personal identifying information.

18. One or more memories as described in claim 17, further comprising instructions to perform one or more actions to manage detected personal identifying information.

19. One or more memories as described in claim 18, further comprising instructions to track personal identifying information sent from the client in the performance of the one or more actions.

20. One or more memories as described in claim 16, wherein the risk assessment report provides a risk indication based at least on aggregating the PII released in the plurality of outbound communications, the risk assessment report providing an indication including at least one of a risk associated with each item of PII released, an overall assessment of risk based at least on the aggregated PII, threat information from the aggregated PII, information identifying the PII released, or corresponding recipients of the PII.

* * * * *